United States Patent [19]

Foley et al.

[11] Patent Number: 5,399,127
[45] Date of Patent: Mar. 21, 1995

[54] ENDLESS BELTS INCORPORATING STIFFENING MEMBERS

[75] Inventors: Geoffrey M. T. Foley, Fairport; Eugene A. Swain; Gary J. Maier, both of Webster, all of N.Y.

[73] Assignee: Xerox Corporation, Stamford, Conn.

[21] Appl. No.: 165,124

[22] Filed: Dec. 10, 1993

[51] Int. Cl.⁶ .............................................. F16G 1/00
[52] U.S. Cl. ..................................................... 474/270
[58] Field of Search ............................... 474/260–272, 474/237, 238

[56] References Cited

U.S. PATENT DOCUMENTS 3,378,469  4/1968  Jochim ........................................ 204/7
4,902,386  2/1990  Herbert et al. .
5,127,885  7/1992  Herbert et al. ......................... 474/260

Primary Examiner—Michael Powell Buiz
Attorney, Agent, or Firm—Zosan S. Soong

[57] ABSTRACT

An endless belt is disclosed comprising: (a) an electrodeposited metal layer having a first end region and a second end region; and (b) an electrically conductive stiffening member integrated with the first end region. There is also disclosed a process comprising: (a) positioning a first electrically conductive stiffening member in a first end region of a mandrel; (b) depositing a layer of metal over the mandrel and over the first stiffening member to form an article comprised of a first end region, and thereby integrating the first stiffening member with the first end region of the article; and (c) removing the article and the integral first stiffening member from the mandrel.

12 Claims, 2 Drawing Sheets

ENDLESS BELTS INCORPORATING STIFFENING MEMBERS

CROSS REFERENCE TO RELATED COPENDING APPLICATION

Attention is directed to the following related application filed concurrently: Eugene A Swain et al., "Endless Belts Incorporating Thickened Bands" Ser. No. 08/165,123 filed Dec. 10, 1993 (Attorney Docket No.D/93421), the disclosure of which is totally incorporated by reference.

BACKGROUND OF THE INVENTION

This invention relates generally to endless members or belts and their fabrication, and more specifically to electrodeposited endless belts having one or two integrated stiffening members and methods for the fabrication of such stiffened endless belts. The endless belts of the present invention may be used for example in the fabrication of photosensitive or photoconductive imaging members employed in electrostatographic imaging apparatus.

Endless belts, especially seamless, electroformed metal belts, may be thin and flexible. However, thin and flexible belts are difficult to handle without damage when fabricating photosensitive members. Moreover, thin and flexible belts are usually considered unsuitable for equipment designed to handle rigid cylindrical substrates. It is known that during electroforming, there may occur the phenomenon of an "edge effect" wherein the ends of the electroformed article become slightly thickened. For example, the ends may have a thickness up to 1.3 times greater than the thickness of the center portion of the article. Due to the geometry of the plating cell, the top and bottom of the electroformed article may have higher current density areas. These higher current density areas may result in thicker deposits near the ends. This process in which thicker deposits form near the ends of the electroformed article is called the "edge effect." However, even those thin, flexible belts having slightly thickened ends due to "edge effect," are insufficiently rigid or stiff to minimize handling damage when fabricating photosensitive members and are insufficiently rigid or stiff for equipment designed to handle rigid cylindrical substrates. There is a need for a way to temporarily stiffen flexible endless belts to minimize handling damage during the fabrication of photosensitive members.

Herbert et al., U.S. Pat. No. 5,127,885, discloses an endless metal belt comprising a center region between two edge regions, wherein the ductility of at least one edge region is greater than the ductility of the center region.

Jochim, U.S. Pat. No. 3,378,469, discloses the use of a rigid backing structure in an electroforming process, reference for example column 4.

SUMMARY OF THE INVENTION

It is an object of the present invention to provide a method and apparatus for temporarily stiffening an endless flexible belt, especially an electrodeposited metal belt.

It is an object to provide an endless belt having stiffening members integrated with one or both end regions or areas of the belt, wherein the stiffening members may be removed to result in a belt having a dimension suitable for use, for example, in a photoconductive imaging member in an electrostatographic imaging apparatus.

It is a further object to provide a thin, flexible, seamless, endless belt having stiffened end regions to minimize handling damage during fabrication of photosensitive members.

It is an additional object in embodiments to provide a thin, flexible endless belt having stiffened end regions to render the belt suitable for use in equipment designed to handle rigid cylindrical substrates.

These objects and others are accomplished in embodiments by providing an endless belt comprising: (a) an electrodeposited metal layer having a first end region and a second end region; and (b) an electrically conductive stiffening member integrated with the first end region.

In embodiments, there is provided an endless belt comprising: (a) an electrodeposited metal layer having a first end region and a second end region; (b) a first electrically conductive stiffening member integrated with the first end region; and (c) a second electrically conductive stiffening member integrated with the second end region.

In embodiments, there is provided an endless belt comprising: (a) an electrodeposited metal layer having a first end region and a second end region; and (b) a stiffening member fastened to the first end region.

In embodiments, there is provided a process comprising: (a) positioning a first electrically conductive stiffening member in a first end region of a mandrel; (b) depositing a layer of metal over the mandrel and over the first stiffening member to form an article comprised of a first end region, and thereby integrating the first stiffening member with the first end region of the article; and (c) removing the article and the integral first stiffening member from the mandrel.

In embodiments, there is provided a process comprising: (a) positioning a first electrically conductive stiffening member in a first end region of a mandrel, and positioning a second electrically conductive stiffening member in a second end region of the mandrel; (b) depositing a layer of metal over the mandrel, over the first stiffening member, and over the second stiffening member to form an article comprised of a first end region and a second end region, and thereby integrating the first stiffening member with the first end region of the article and integrating the second stiffening member with the second end region of the article; and (c) removing the article, the integral first stiffening member, and the integral second stiffening member from the mandrel.

BRIEF DESCRIPTION OF THE DRAWINGS

Other aspects of the present invention will become apparent as the following description proceeds and upon reference to the Figures which represent preferred embodiments.

DETAILED DESCRIPTION

Figure 1:
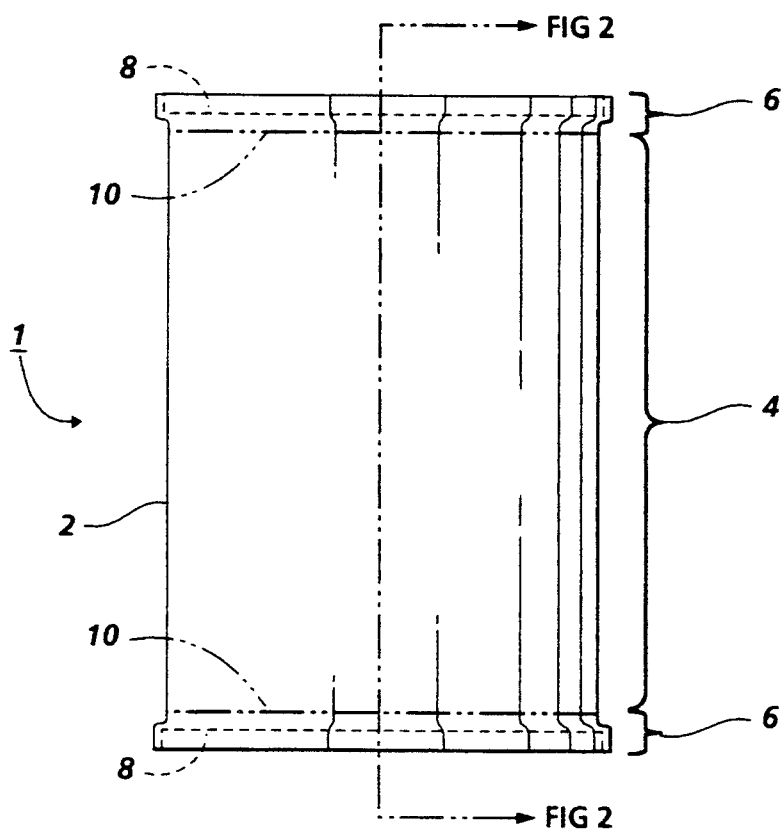
FIG. 1 is a top view of a seamless, endless metal belt incorporating integral stiffening members.
Figure 2:
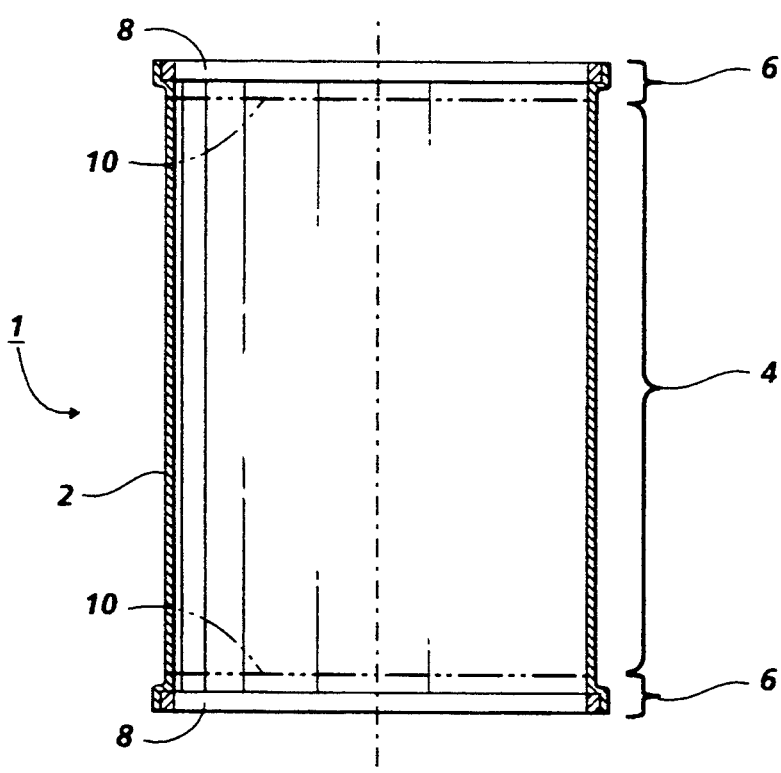
FIG. 2 is a view of the interior surface of the belt of FIG. 1 taken along perspective 2—2 of FIG. 1.

FIGS. 1 and 2 disclose endless belt 1 comprised of metal layer or article 2 incorporating two integral stiffening members 8. Article 2 is comprised of center region 4 between two end regions 6. The precise dimensions of the article's center region 4 and end regions 6 may vary in embodiments. An illustrative, imaginary boundary 10 between center region 4 and end regions 6 is represented by phantom lines in FIGS. 1 and 2. For article 2, the end regions may include in embodiments the side edges and a portion of the end region adjacent the side edges such as that end region portion ranging from about 1 to about 20 cm adjacent each edge. In embodiments, the dimensions of each end region 6 is selected so that its removal will result in the remaining center region 4 having the desired dimensions of the belt 1. The article may incorporate only a single stiffening member in certain embodiments and there may be no need to remove both end regions. Thus, in embodiments, only one end region (which includes the stiffening member) is removed and the center region and the remaining end region have the dimensions of the desired belt. The article has a front surface, preferably seamless, which may receive additional layered materials such as a photosensitive layer, and a back surface, which is in contact with the stiffening members. Each stiffening member may back an effective portion of: the back surface of the article, preferably ranging from about 10 to 100% of each end region's back surface area, and more preferably ranging from about 30 to about 90% of each end region's back surface area. In embodiments, an edge of the stiffening member, which may be uncoated with the metal layer, may extend beyond the edge of the article, by a distance ranging for example from about 1 mm to about 5 cm. In embodiments, the stiffening members do not contact the front and back surfaces of the center region. Although an edge of the stiffening member may coincide with the boundary between the center region and the end region of the article, the edge of the stiffening member is preferably located at a distance from the boundary such as from about 1 mm to about 5 cm away from the boundary.

Deposition of the metal layer over the stiffening members integrates each stiffening member with an end region of the article. The term "integral," "integrates," "integrating," and similar terms as used herein refers to joining, without the use of for example an adhesive and welding of the stiffening members with the article's end regions in a type of bonding preferably akin to that existing between an electrodeposited layer and a mandrel, whether by electroplating or by electroforming.

The metal layer or article has an effective thickness, preferably ranging from about 10 microns to about 200 microns, and more preferably ranging from about 20 microns to about 100 microns. In embodiments, the metal layer has a generally uniform thickness, including the portion over the stiffening members. The metal layer also may have in embodiments a generally flat or smooth exterior surface except that portion over the stiffening members, wherein the metal layer surface profile is then curved in conformance with the underlying stiffening members.

To fabricate the endless belts of the present invention, there is provided a mandrel having a center region between a first end region and a second end region. The precise dimensions of the mandrel's center region, first end region, and second end region may change in embodiments. For cylindrical mandrels, the end regions include the top and bottom edges and a portion of the mandrel surface adjacent the edges such as that mandrel surface portion ranging from about 1 to about 20 cm adjacent each edge.

The mandrel may have any effective design, and may be hollow or solid. The mandrel may have any effective cross-sectional shape such as cylindrical, oval, square, rectangular, or triangular. In embodiments, the mandrel may have tapered sides, but parallel sides are preferred. Suitable mandrels include cylindrically shaped mandrels such as that illustrated in DuPree, U.S. Pat. No. 3,954,568, the disclosure of which is totally incorporated by reference, and mandrels having an ellipsoid or parabolic shaped end, with the mandrel profile preferably like that illustrated in Herbert et al., U.S. Pat. No. 4,902,386, the disclosure of which is totally incorporated by reference. The mandrel may be of any suitable dimensions. For example, the mandrel may have a length ranging from about 5 cm to about 150 cm; and an outside diameter ranging from about 1 cm to about 100 cm. The mandrel may be fabricated from any suitable material, preferably a metal such as aluminum, nickel, steel, iron, copper, and the like.

The mandrel may be optionally plated with a protective coating. Typical plated protective coatings for mandrels include chromium, nickel, alloys of nickel, iron, and the like. The plated metal should preferably be harder than the metal used to form the electroform and is of an effective thickness of for example at least about 0.003 mm in thickness, and preferably from about 0.008 to about 0.05 mm in thickness. The outer surface of the plated mandrel preferably is passive, i.e., adhesive, relative to the metal that is electrodeposited to prevent adhesion during electroforming. Other factors that may be considered when selecting the metal for plating include cost, nucleation, adhesion, oxide formation and the like. Chromium plating is a preferred material for the outer mandrel surface because it has a naturally occurring oxide and surface resistive to the formation of a strongly adhering bond with the electrodeposited metal such as nickel. However, other suitable metal surfaces could be used for the mandrels. The mandrel may be plated using any suitable electrodeposition process. Processes for plating a mandrel are known and described in a number of patents. For example, a process for applying multiple metal platings to an aluminum mandrel is described in U.S. Pat. No. 4,067,782, and 4,902,386, the disclosures of which are totally incorporated by reference.

An electrically conductive stiffening member is positioned in each end region of the mandrel. Although only one stiffening member may be employed, it is preferred to position two stiffening members, one stiffening member on each end region of the mandrel. Preferably, the stiffening member is positioned around the entire outer dimension of the mandrel's end region. The stiffening member may cover an effective amount of the surface area of each end region, such coverage preferably ranging from $\frac{1}{3}$ to the entire surface of each end region.

The stiffening members may be positioned in the mandrel's end regions by any suitable technique. One technique is wrapping the stiffening member, which may be in the form of a strip, around the end region and then joining the ends of the strip in an edge to edge arrangement such as by butt welding or by employing an adhesive. Suitable adhesives include: KALEX TUFF STUFF TM urethane adhesive (available from Hardman Inc., Bellville N.J.); E-Solder No. 3025 conductive adhesive (available from Acme Division, New Haven, Conn.); Quick Set 404, Super Bonder No. 414 for plastics, and Super Bonder No. 430 for metals (all available from Loctite Corp., Newington Conn.). The length of the strip is selected such that the strip is taut around the mandrel when its ends are joined. A second technique involves the following: selecting the stiffening member in the form of a band (which may be for example a strip joined end to end or an endless, seamless strip) which may have an inner dimension slightly less (such as about 1 to about 10% less) than the outer dimension of the mandrel's end region or about the same size as the outer dimension of the mandrel's end region; heating the stiffening member at an effective temperature such as from about 50° to about 150° C. to expand the inner dimension of the stiffening member such as by 1 to about 10%; slipping the heat expanded stiffening member around the mandrel's end region; and permitting the stiffening member to cool so that it tautly encircles the mandrel's end region.

To receive the metal layer on its surface, the stiffening member can be fabricated entirely of an electrically conductive material, or it can be an insulating material having an electrically conductive surface. The member can comprise numerous suitable materials having the desired mechanical properties. The entire stiffening member can comprise the same material as that in the electrically conductive surface or the electrically conductive surface can merely be a coating on the member. Any suitable electrically conductive material can be employed. Typical electrically conductive materials include metals like copper, brass, nickel, zinc, chromium, stainless steel; and conductive plastics and rubbers, carbon, aluminum, semitransparent aluminum, steel, cadmium, titanium, silver, indium, tin, metal oxides, including tin oxide and indium tin oxide, and the like. Where the stiffening member is an electrically insulating material overcoated with an electrically conductive layer, the insulating material may be a resin including polycarbonates, polyamides, polyurethanes, paper, glass, plastic, polyesters such as MYLAR® (available from DuPont) or MELINEX 447® (available from ICI Americas, Inc.), and the like, and the electrically conductive layer may be any suitable conductive material disclosed herein. In addition, the stiffening member may be a metallized plastic, such as titanized or aluminized MYLAR®. In embodiments, the stiffening member may comprise two or more layers of the same or different electrically conductive material. The stiffening member is preferably continuous and may be in any suitable configuration including a sheet, a strip, or a band. The materials and thickness of the stiffening member are selected to provide it with greater stiffness than the metal layer. The stiffening member has a stiffness preferably about 2 to 10 times, and more preferably about 3 to about 7 times, greater than that of the metal layer. The stiffening member may have an effective thickness ranging for example from about 10 microns to about 200 microns, and preferably from about 20 microns to about 100 microns. The stiffening member may be in the form of a band having a length ranging for example from about 3 cm to about 300 cm, and a width ranging for example from about 5 mm to about 100 mm, and preferably from about 10 mm to about 50 mm. Where the stiffening member is comprised of an insulating member overcoated with an electrically conductive layer, the insulating member has an effective thickness, ranging for example from about 10 microns to about 200 microns, and the conductive layer has an effective thickness, ranging for example from about: 0.5 micron to about 75 microns. In embodiments employing two stiffening members, the members may have the same or different configuration, materials, and/or thickness.

Figure 3:
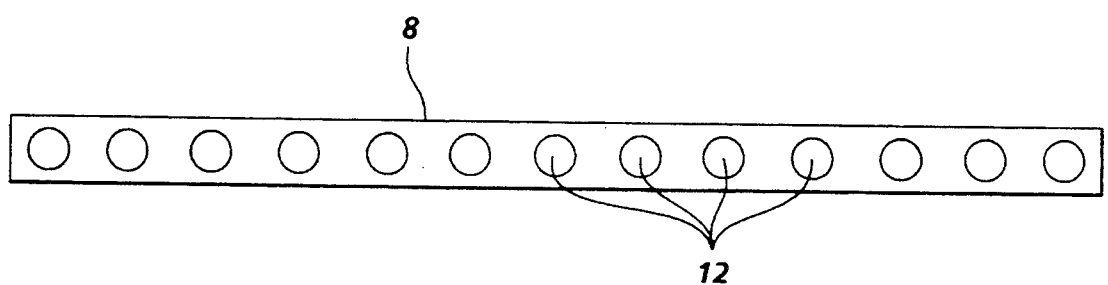
FIG. 3 is a top view of a stiffening member in the form of a strip having a plurality of holes.

In embodiments of the present invention, one or both stiffening members preferably have a plurality of openings through the members. FIG. 3 discloses illustrative stiffening member 8 in the form of a strip having a plurality of holes 12 arranged at intervals along member 8. It is believed the openings will enhance integration of the stiffening members with the metal layer. The openings may be of any suitable number, size, shape, and arrangement having the following illustrative configurations: a number ranging from 2 to about 30; an opening size independently ranging from about 1 to about 5 cm; a circular, oval, square, or triangular opening shape; and a random or patterned opening arrangement. In embodiments, there is a plurality of same-sized openings arranged at regular intervals (the interval may be a value selected from the range of about 1 to about 5 cm) around the perimeter of the stiffening member, wherein the openings may be linearly disposed around the stiffening member.

A metal layer is deposited over the mandrel and the stiffening members in any suitable process including an electrodeposition process, and especially electroplating and electroforming. In embodiments, each stiffening member has a front surface and a back surface, wherein the metal layer covers a portion of the front surface of each stiffening member, preferably from about 20 to 100% of the front surface of each stiffening member, and the back surface of each stiffening member is free of the metal layer. A typical electrodeposition cycle, especially electroforming, is illustrated in Bailey et al., U.S. Pat. No. 3,844,906, the disclosure of which is totally incorporated by reference. An electroforming cycle is comprised for example of different cells such as the preheat cell, the metal deposition vessel, the solution recovery cell, and the cooling cell.

A preferred electroforming or plating solution follows: Total Deposition Metal (such as nickel or copper): 9.0 to 15.0 oz/gal (the recited concentration for the Total Deposition Metal refers to the metal alone without any counterions and includes the metal component of the halide compound disclosed herein as $MX_2 \bullet 6H_2O$);

Deposition Metal (M) Halide (X) as $MX_2 \bullet 6H_2O$: 0.11 to 0.23 moles/gal, where M is a metal such as nickel or copper, and X is a halogen such as fluorine, chlorine, iodine, and bromine;and Buffering Agent (such as $H_3BO_3$): 4.5 to 6.0 oz/gal.

The metal halide may be any suitable compound typically used in electroforming solutions preferably nickel chloride, nickel bromide, nickel fluoride, copper chloride, copper bromide, and copper fluoride.

Optionally, there is continuously charged to the above solution about 1.0 to $2.0 \times 10^{-4}$ moles of a stress reducing agent per mole of deposition metal electrolytically deposited from the solution. Suitable stress reducing agents include sodium sulfobenzimide (saccharin), 2-methylbenzenesulfonamide, benzene sulfomate, naphthalene trisulfomate, and mixtures thereof.

For continuous, stable operation with high throughput and high yield of acceptable electroformed articles, a nickel sulfamate solution is preferred and is maintained at an equilibrium composition within the electroforming zone. The preferred nickel sulfamate solution comprises:

Total Nickel: 10.0 to 14.0 oz/gal (the recited concentration for the Total Nickel refers to the metal alone without any counterions and includes the nickel component of the halide compound disclosed herein as $NiCl_2 \cdot 6H_2O$);

Chloride as $NiCl_2 \cdot 6H_2O$: 1.6 to 1.7 oz/gal;

$H_3BO_3$: 5.0 to 5.4 oz/gal;

Weight Ratio (Chloride as $NiCl_2 \cdot 6H_2O$)/Total Nickel: $0.12 \pm 0.02$;

pH: 3.8 to 4.1; and

Surface Tension (measured by a Surface Tensionmeter): 33 to 37 dynes/cm$^2$.

Additionally, from about 1.3 to $1.6 \times 10^{-4}$ moles of a stress reducing agent per mole of nickel electrolytically deposited from said solution is continuously charged to said electroforming solution.

The electrodeposition solutions are primarily illustrated herein with specific ranges of nickel metal and nickel halide, but it is understood that other metals and metal halides as well as ranges outside those specifically disclosed herein, which may be employed in electrodeposition processes, are encompassed within embodiments of the present invention.

It has been found that the pH can be essentially maintained within the range set forth above by ensuring a steady state concentration of buffering agent in the solution, generally boric acid ($H_3BO_3$), within the range of 5.0 to 5.4 oz/gal.

Control of the surface tension of the electroforming or plating solution may be necessary in order to substantially reduce surface flaws, especially pitting in the electrodeposited article. The surface tension of the solution preferably ranges from about 33 to about 37 dynes/cm$^2$ in order to assure a high rate of production with minimum rejects because of surface flaws. The surface tension of the solution can be maintained within this range by maintaining a steady state concentration of an anionic surfactant such as sodium lauryl sulfate, Duponol 80, a sodium alcohol sulfate, Petrowet R, a sodium hydrocarbon sulfonate (said latter two surfactants being available from E. I. du Pont de Nemours & Co., Inc.), and the like, ranging from 0 to 0.014 oz/gal within the solution, and preferably, by maintaining a steady state concentration of from 0 to 0.007 oz/gal of surfactant therein.

The temperature of the electroforming or plating solution may be between about 100° and 160° F. and preferably is between about 135° and 160° F. Current density supplied by a DC source is about 20 to 600 amperes per square foot of mandrel surface.

Because of the effects of both temperature and solution composition on the final product, it is preferred to maintain the electrodeposition solution in a constant state of agitation thereby substantially precluding localized hot or cold spots, stratification and inhomogeneity in composition. Agitation may be obtained by continuous rotation of the mandrel and by impingement of the solution upon the mandrel and cell walls as the solution is circulated through the system. Generally, the solution flow rate across the mandrel surface can range from about 4 to 10 linear feet/second. For example, at a current density of about 300 amps/ft$^2$ with a desired solution temperature range within the cell of about 150° to 160° F., a flow rate of about 15 gal/min of solution may be sufficient to effect proper temperature control. The combined effect of mandrel rotation and solution impingement may assure uniformity of composition and temperature of the electrodeposition solution within the electrodeposition cell.

Further details of the electrodeposition, especially electroforming, solution, apparatus, and methods are illustrated in Bailey et al., U.S. Pat. No. 3,844,906 and Wallin et al., U.S. Pat. No. 3,876,510, the disclosures of which are totally incorporated by reference.

The metal layer and the stiffening members are removed from the mandrel by any suitable process and apparatus. For example, an effective parting gap may be produced between the mandrel and the metal layer as well as between the mandrel and the stiffening members by reliance on differences in thermal coefficients of expansion of the materials employed for the mandrel, metal layer, and the stiffening members. Either heating or cooling may be employed to secure the parting gap. Parting gap methods and apparatus are illustrated in Herbert, U.S. Patent 4,501,646; Herbert et al., U.S. Pat. No. 5,167,791; Herbert et al., U.S. Pat. No. 4,902,386; Wallin, U.S. Pat. No. 3,799,859; Bailey et al., U.S. Pat. No. 3,844,906; and DuPree, U.S. Pat. No. 3,954,568, the disclosures of which are totally incorporated by reference. Preferably, the parting gap ranges from about 0.1 mm to about 1 cm, and more preferably from about 0.1 mm to about 5 mm in width.

In embodiments, when the layer of deposited metal has reached the desired thickness, the mandrel with the deposited metal layer and the stiffening members are immersed in a cold water bath. The temperature of the cold water bath is preferably between about 80° F. and about 33° F. When the mandrel is immersed in the cold water bath, the metal layer and the stiffening members may be cooled prior to any significant cooling and contracting of the mandrel. Since the metal layer and the stiffening members are unable to contract, the metal layer and the stiffening members may become permanently deformed, so that after the mandrel is cooled and contracted, the metal layer and the stiffening members may be easily removed from the mandrel.

In an alternative embodiment, the stiffening members are not positioned on the mandrel prior to deposition of the metal layer. Instead, the stiffening members may be fastened to the back surface of the article's end region by the use of adhesives or welding subsequent to the removal of the article from the mandrel. The term "fastened" as used herein refers to the use of an adhesive or welding to effect joining of the stiffening members to the article. Suitable adhesives include for example the adhesives described herein. The adhesive may be in a layer of an effective thickness ranging for example from about 0.3 mm to about 2 mm. Since the metal layer is not deposited on the stiffening member in this alternative embodiment, the stiffening member may be comprised entirely of an electrically insulating material or an insulating coating. In this alternative embodiment, the stiffening member may have the same or similar configuration, materials, and dimensions as the integral stiffening members disclosed herein. In this alternative embodiment, the stiffening member may be continuous or in separate pieces such as two, three, four, or more pieces.

Subsequent to removal of the article from the mandrel, one or more of the following layers may be applied to the article: a charge blocking layer, an adhesive layer, photoconductive layer(s) and an anti-curl layer, and any other layer typically employed in a photoreceptor. Components for each of the layers are as described herein and are illustrated for example in Yu, U.S. Pat.

No. 5,167,987, the disclosure of which is totally incorporated by reference. The photoconductive or photosensitive layer may be of the laminate type having separate charge generating and charge transporting layers or may be of the single-layer type. Preferred charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments; indigo pigments such as indigo, thioindigo, and the like; bisbenzoimidazole pigments such as Indofast Orange toner, and the like; phthalocyanine pigments such as copper phthalocyanine, aluminochloro-phthalocyanine, titanyl phthalocyanine, chloro-gallium phthalocyanine, hydroxy-gallium phthalocyanine, vanadyl phthalocyanine, and the like; quinacridone pigments; and azulene compounds. Preferred charge transport materials include compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and the like, aryl amines, and hydrazone compounds. Illustrative photoconductive layers are found in for example Stolka et al., U.S. Pat. No. 4,265,990, the disclosure of which is totally incorporated by reference, which discloses a charge transport layer comprising a polycarbonate resin and an aryl amine. Other typical photoconductive layers include amorphous or alloys of selenium such as selenium-arsenic, selenium-tellurium-arsenic, selenium-tellurium, and the like. The photoconductive layer(s) may be of any suitable thickness. A single layer type photoconductive layer may have a thickness preferably of about 0.1 to about 100 microns. In preferred embodiments, the charge generating and charge transport layers of a laminate type each may have a thickness of about 0.05 microns to about 50 microns.

Some materials can form a layer which functions as both an adhesive layer and charge blocking layer. Typical blocking layers include polyvinylbutyral, organosilanes, epoxy resins, polyesters, polyamides, polyurethanes, silicones, and the like. The polyvinylbutyral, epoxy resins, polyesters, polyamides, and polyurethanes can also serve as an adhesive layer. Adhesive layers, charge blocking layers, anti-curl layers and any other layers conventionally employed in photoreceptors may have an effective thickness, and preferably from about 0.1 to about 20 microns.

The layered materials described herein may be applied by any known technique and apparatus including dip coating, spray coating, electrodeposition, and vapor deposition. Compositions of the layered materials described herein and techniques and apparatus for their application to the article are illustrated in U.S. Pat. No. 4,390,611, U.S. Pat. No. 4,551,404, U.S. Pat. No. 4,588,667, U.S. Pat. No. 4,596,754, and U.S. Pat. No. 4,797,337, the disclosures of which are totally incorporated by reference.

Subsequent to the coating of layered material on the article, one or both end regions of the article may be removed by any suitable method and apparatus including employing a cutting device such as a laser, rotary knife slitter, scissor type shear or electrodischarge machining. Although a portion, such about $\frac{1}{4}$ to about $\frac{3}{4}$, of one or both end regions may be removed in embodiments, it is preferred to remove both end regions in their entirety.

Other modifications of the present invention may occur to those skilled in the art based upon a reading of the present disclosure and these modifications are intended to be included within the scope of the present invention.

We claim:

1. An endless belt comprising:
   (a) an electrodeposited metal layer having a first end region and a second end region; and
   (b) an electrically conductive stiffening member integrated with the first end region.

2. An endless belt comprising:
   (a) an electrodeposited metal layer having a first end region and a second end region;
   (b) a first electrically conductive stiffening member integrated with the first end region; and
   (c) a second electrically conductive stiffening member integrated with the second end region.

3. The belt of claim 2, wherein the metal layer has a thickness ranging from about 10 microns to about 200 microns.

4. The belt of claim 2, wherein the metal layer has a thickness ranging from about 20 microns to about 100 microns.

5. The belt of claim 2, wherein the first stiffening member and the second stiffening member have a thickness ranging from about 10 microns to about 200 microns.

6. The belt of claim 2, wherein the first stiffening member and the second stiffening member have a thickness ranging from about 20 microns to about 100 microns.

7. The belt of claim 2, wherein the first stiffening member and the second stiffening member are independently comprised of a metal or a conductive plastic.

8. The belt of claim 2, wherein the first stiffening member and the second stiffening member are in the form of a band.

9. The belt of claim 2, wherein the first stiffening member and the second stiffening member include a plurality of openings.

10. The belt of claim 2, wherein each stiffening member has a front surface and a back surface, and wherein the metal layer covers a portion of the front surface of each stiffening member and the back surface of each stiffening member is free of the metal layer.

11. The belt of claim 2, further comprising a layer of photosensitive material.

12. An endless belt comprising:
   (a) an electrodeposited metal layer having a first end region and a second end region; and
   (b) a stiffening member fastened to the first end region.

* * * * *